(12) United States Patent
Kobayashi

(10) Patent No.: US 11,001,966 B2
(45) Date of Patent: *May 11, 2021

(54) MEASURING DEVICE, WEB PROCESSING DEVICE, FIBER FEEDSTOCK RECYCLING DEVICE, AND MEASURING METHOD

(71) Applicant: SEIKO EPSON CORPORATION, Tokyo (JP)

(72) Inventor: Nao Kobayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,727

(22) Filed: Jul. 5, 2019

(65) Prior Publication Data

US 2020/0011010 A1 Jan. 9, 2020

(30) Foreign Application Priority Data

Jul. 6, 2018 (JP) .............................. JP2018-128783

(51) Int. Cl.
| | |
|---|---|
| *D21F 3/10* | (2006.01) |
| *D21B 1/32* | (2006.01) |
| *G01B 11/06* | (2006.01) |
| *D21F 3/08* | (2006.01) |
| *D21F 3/02* | (2006.01) |
| *B32B 27/10* | (2006.01) |

(52) U.S. Cl.
CPC ............. *D21B 1/32* (2013.01); *D21F 3/0272* (2013.01); *D21F 3/08* (2013.01); *D21F 3/10* (2013.01); *G01B 11/0691* (2013.01); *B32B 27/10* (2013.01)

(58) Field of Classification Search
USPC ......................................... 162/205, 263, 198
See application file for complete search history.

(56) References Cited

U.S. PATENT DOCUMENTS

2011/0222071 A1 9/2011 Grotkopp et al.
2020/0011013 A1* 1/2020 Kobayashi ............ D21F 1/0027

FOREIGN PATENT DOCUMENTS

| JP | 07-003603 A | 1/1995 |
| JP | 2012-504752 A | 2/2012 |

* cited by examiner

*Primary Examiner* — Mark Halpern
(74) *Attorney, Agent, or Firm* — Global IP Counselors, LLP

(57) ABSTRACT

The thickness of accumulated fiber can be appropriately measured when accumulating and processing fiber. A measuring device includes a distributor 60 that disperses material containing fiber; a mesh belt 72 that accumulates material dispersed by the distributor 60; a roller unit 650 that compresses a second web W2 accumulated on the mesh belt 72; and a measurement device 400 that measures the thickness of the second web W2 after compression by the roller unit 650.

10 Claims, 12 Drawing Sheets

MEASURING DEVICE, WEB PROCESSING DEVICE, FIBER FEEDSTOCK RECYCLING DEVICE, AND MEASURING METHOD

BACKGROUND

1. Technical Field

The present invention relates to a measuring device, a web processing device, a fiber feedstock recycling device, and a measuring method.

This application is based upon Japanese Patent Application 2018-128783 filed on Jul. 6, 2018, the entire contents of which are incorporated by reference herein.

2. Related Art

Devices for processing paper fiber are known from the literature. See, for example, JP-A-H7-3603. The device disclosed in JP-A-H7-3603 forms a mat by spraying a mixture of recovered paper fiber and binder onto a screen. The mat is then processed into a molded product of recovered paper fiber by applying pressure and heat.

Methods of measuring the thickness of a formed product by detecting the reflection of light emitted to the object of which the thickness is to be measured are known from the literature. See, for example, JP-T-2012-504752. The method disclosed in JP-A-H7-3603 enables measuring the thickness of an object without touching the object.

In a device that accumulates and processes fiber as described in JP-A-H7-3603, the thickness of the accumulated fiber is preferably maintained at a desirable level. However, measuring the thickness of the accumulated fiber is not simple. For example, when the thickness of the accumulated fiber is measured as described in JP-T-2012-504752, peaks and valleys in the surface of the accumulated fiber can cause significant variation in the measured thickness.

SUMMARY

An object of the present invention is to provide technology enabling appropriately measuring the thickness of accumulated fiber when accumulating and processing fiber.

To achieve the foregoing objective, a measuring device according to a preferred aspect of the invention includes: a distributor configured to disperse material containing fiber; an accumulator configured to accumulate the material dispersed by the distributor; a compression device configured to compress accumulated material accumulated on the accumulator; and a measurement device configured to measure a thickness of the accumulated material compressed by the compression device.

In another aspect of the invention, the measurement device may be configured to measure a thickness of the accumulated material after the accumulated material is compressed by the compression device.

In a measuring device according to another aspect of the invention, the compression device includes a pressure roller that contacts the accumulated material and applies pressure to the accumulated material, and a displacement member enabling the pressure roller to move according to the thickness of the accumulated material; and the measurement device measures displacement of the pressure roller.

In a measuring device according to another aspect of the invention, the distributor has a case, and a configuration that disperses the material inside the case; and the pressure roller is disposed to a discharge exit through which the accumulated material is discharged from the case.

In a measuring device according to another aspect of the invention, the compression device has a suction device configured to suction air current through the accumulated material; and the measurement device measures a thickness of the accumulated material suctioned and compressed by the suction device.

A measuring device according to another aspect of the invention also has a conveyor having a conveyance surface on which the accumulated material accumulates, and configured to convey the accumulated material; and the measurement device measures a thickness of the accumulated material referenced to the conveyance surface at a position on a same side of the conveyance surface as the accumulated material.

A measuring device according to another aspect of the invention has a plurality of measurement devices disposed along a direction intersecting a conveyance direction of the accumulated material, and each of the plural measurement devices measures a thickness of the accumulated material.

To achieve the foregoing objective, a web processing device according to another aspect of the invention has a distributor configured to disperse material containing fiber; an accumulator configured to accumulate the material dispersed by the distributor and form a web; a first compression device configured to compress the web; a measurement device configured to measure a thickness of the web compressed by the first compression device; and a second compression device configured to compress the web compressed by the first compression device after measurement by the measurement device.

In a web processing device according to another aspect of the invention, the first compression device compresses the web with less pressure than the second compression device.

To achieve the foregoing objective, a fibrous feedstock recycling device according to another aspect of the invention includes: a defibrator configured to defibrate material containing fiber; a distributor configured to disperse defibrated material defibrated by the defibrator; an accumulator configured to accumulate the defibrated material dispersed by the distributor and form a web; a first compression device configured to compress the web; and a measurement device configured to measure a thickness of the web compressed by the first compression device; and a second compression device configured to compress the web compressed by the first compression device after compression by the first compression device.

To achieve the foregoing objective, a measurement method according to another aspect of the invention enables measuring a thickness of a web while compressing the web in a device that disperses material containing fiber, accumulates the dispersed material, and forms a web.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the invention are described below with reference to the accompanying figures. Note that the embodiments described below do not limit the content of the embodiment described in the accompanying claims. All configurations described below are also not necessarily essential elements of the invention.

1. Embodiment 1

1. General Configuration of a Sheet Manufacturing Apparatus

Figure 1:
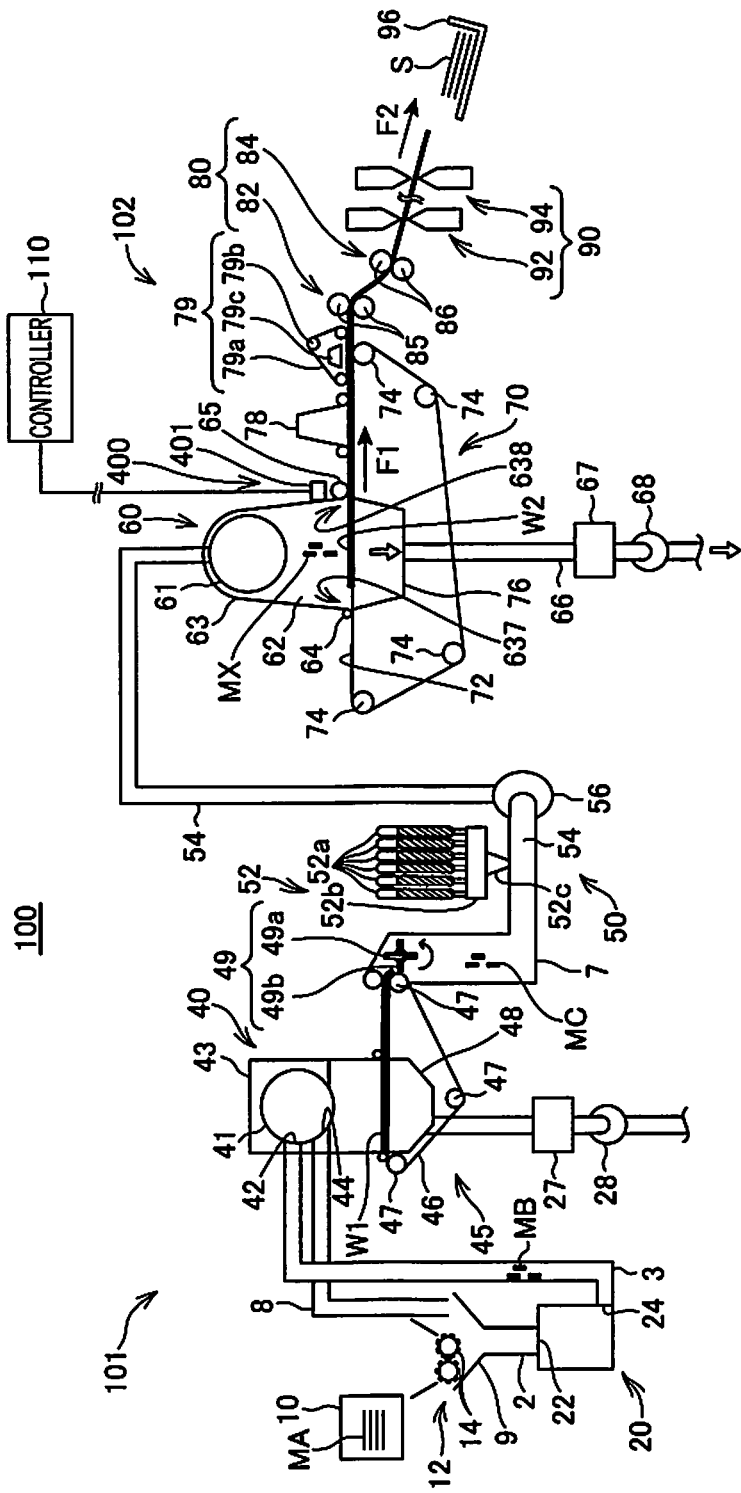
FIG. 1 schematically illustrates the configuration of a sheet manufacturing apparatus according to a first embodiment of the invention.

FIG. 1 schematically illustrates the configuration of a sheet manufacturing apparatus 100 according to the invention.

The sheet manufacturing apparatus 100 corresponds to a measuring device, a web processing device, and a fibrous feedstock recycling device according to the invention, and executes a recycling process of defibrating feedstock material MA containing fiber and making new sheets S from the fiber. The sheet manufacturing apparatus 100 can also mix additives with the feedstock material MA to adjust the binding strength (paper strength) or whiteness, or add color, scents, or functions such as fire retardancy to the sheet S.

The sheet manufacturing apparatus 100 can also adjust the density, thickness, size, and shape of the sheets S. Typical uses of the sheets S include office paper in standard sizes such as A4 or A3, various kinds of sheet products such as cleaning sheets for cleaning flooring, sheets for cleaning up oil and grease, and sheets cleaning toilets, as well as paper plates and other three dimensional forms, and other products such as cushioning materials, sound absorbent materials, and liquid absorbent materials.

The sheet manufacturing apparatus 100 includes a feedstock feeder 10, shredder 12, defibrator 20, classifier 40, first web former 45, rotor 49, mixing device 50, distributor 60, second web former 70, conveyor 79, former 80, and sheet cutter 90. The shredder 12, defibrator 20, classifier 40, and first web former 45 configure a defibration processor 101 that defibrates the feedstock material MA and acquires material used to make the sheets S. The material produced by the defibration process unit 101 is referred to below as material MC.

The rotor 49, mixing device 50, distributor 60, second web former 70, former 80, and sheet cutter 90 configure a sheet maker 102 that processes the material acquired by the defibration processor 101 and makes sheets S.

A configuration adding a rotor 49 and mixing device 50 to the defibration process unit 101 may also be referred to as a feedstock processing device. The feedstock processing device may be any configuration including at least the mixing device 50 that is capable of manufacturing a mixture MX from feedstock material MA containing fiber and the web material MC.

The feedstock feeder 10 in this example is an automatic sheet feeder that holds and continuously supplies the feedstock material MA to the shredder 12. The feedstock material MA may be any material containing fiber, such as recovered paper, waste paper, and pulp sheets.

The shredder 12 has shredder blades 14, shreds the feedstock material MA in air by the shredder blades 14, and produces paper shreds a few centimeters square. The shape and size of the shreds is not specifically limited. A paper shredder, for example, may be used as the shredder 12. The feedstock material MA shredded by the shredder 12 is then collected in a hopper 9, and conveyed through a conduit 2 to the defibrator 20.

The defibrator 20 defibrates the coarse shreds produced by the shredder 12. Defibration is a process of breaking feedstock material MA containing bonded fibers into single fibers or a few intertwined fibers. The feedstock material MA may also be referred to as material to defibrate or defibration material. The material that has been defibrated by the defibrator 20 is referred to as defibrated material MB.

By the defibrator 20 defibrating the feedstock material MA, resin particles, ink, toner, bleeding inhibitors, and other materials included in the feedstock material MA can be expected to also separate from the fibers. In addition to defibrated fibers that have been separated, the defibrated material MB may contain additives that are separated from the fiber during defibration, including resin particles, ink, toner, and other color additives, bleeding inhibitors, and paper strengthening agents.

The defibrator 20 defibrates in a dry process. A dry process as used herein means that the defibration process is done in air or other gas instead of a wet solution. The defibrator 20 uses a defibrator such as an impeller mill in this example. More specifically, the defibrator 20 has a rotor (not shown in the figure), and a liner (not shown in the figure) positioned around the outside of the rotor, and the shreds go between the rotor and the liner and are defibrated.

The shreds are conveyed by an air current from the shredder 12 to the defibrator 20. The defibrated material MB is carried by the air current from the defibrator 20 through a conduit 3 to the classifier 40. The air current conveying the defibrated material may be generated by the defibrator 20 or the air current may be generated by a blower not shown.

The classifier 40 separates the components contained in the defibrated material MB by the size of the fiber. The size of the fiber primarily indicates the length of the fiber. The classifier 40 includes a drum 41, and a housing 43 enclosing the drum 41.

The drum 41 in this example is a sieve such as mesh, a filter or a screen with openings. More specifically, the drum 41 is a cylinder that is rotationally driven by a motor, and has mesh in at least part of its outside surface. The mesh of the drum 41 may be a metal screen, expanded metal made by expanding a metal sheet with slits formed therein, or punched metal, for example.

Defibrated material MB introduced from the inlet 42 to the inside of the drum 41 is separated by rotation of the drum 41 into precipitate that passes through the openings in the drum 41, and remnants that do not pass through the openings.

The precipitate that passes through the openings contains fiber and particles smaller than the openings, and is referred to as first screened material.

The remnants include fibers, undefibrated shreds, and clumps that are larger than the openings, and are referred to as second screened material.

The first screened material precipitates inside the housing 43 and descends to the first web former 45. The second screened material is conveyed through a conduit 8 to the defibrator 20 from an exit opening 44 that communicates with the inside of the drum 41.

Instead of using a sieve-type classifier 40, the sheet manufacturing apparatus 100 may use a cyclone classifier, elbow-jet classifier, or eddy classifier, for example, that selects and separates the first screened material and second screened material.

The first web former 45 includes a mesh belt 46, tension rollers 47, and a suction device 48. The mesh belt 46 is an endless metal belt, and is mounted around multiple tension rollers 47. The mesh belt 46 circulates in a path configured by the tension rollers 47. Part of the path of the mesh belt 46 is flat in the area below the drum 41, and the mesh belt 46 forms a flat surface.

Numerous openings are formed in the mesh belt 46, and components of the first screened material that descends from the drum 41 and are larger than the openings in the mesh belt 46 accumulate on the mesh belt 46. Components of the first screened material that are smaller than the openings in the mesh belt 46 pass through the openings.

Components that pass through the openings in the mesh belt 46 are referred to as third screened material, and include, for example, resin particles, ink, toner, bleeding inhibitors, and other particles that are separated from the fiber by the defibrator 20.

The suction device 48 pulls air from below the mesh belt 46. The suction device 48 is connected through a conduit 23 to a first dust collector 27. The first dust collector 27 separates the third screened material from the air current. Downstream from the first dust collector 27 is a first collection blower 28, and the first collection blower 28 suctions air from the first dust collector 27 and discharges air through the conduit 29 to the outside of the sheet manufacturing apparatus 100.

The third screened material that passes through the openings in the mesh belt 46 is collected by the first dust collector 27. Because the first screened material descending from the drum 41 is pulled to the mesh belt 46 by the air current suctioned by the suction device 48, the air current has the effect of promoting accumulation of the first screened material.

The material accumulated on the mesh belt 46 is formed into a web, and becomes a first web W1. More specifically, the first web former 45 forms a first web W1 from the first screened material selected by the classifier 40.

Of the components of the first screened material, the first web W1 comprises mainly fibers that are larger than the openings in the mesh belt 46, and is a fluffy web containing much air. The first web W1 is conveyed by movement of the mesh belt 46 to the rotor 49.

The rotor 49 has a base 49a connected to a driver such as a motor not shown in the figure, and fins 49b protruding from the base 49a, and when the base 49a is driven, the fins 49b. The fins 49b in this example are flat blades.

The rotor 49 is disposed at the end of the path of the mesh belt 46, and contacts the first web W1 conveyed by the mesh belt 46 at the place where the first web W1 protrudes from the mesh belt 46. The first web W1 is therefore broken up by the fins 49b striking the first web W1, and reduced to small clumps of fiber, which are then conveyed through the conduit 7 to the mixing device 50.

The material separated from the first web W1 by the rotor 49 is web material MC. The first screened material MC is the first screened material from which the third screened material was removed, and its main component is fiber.

The mixing device 50 mixes the web material MC with an additive. The mixing device 50 has an additive supplier 52 that supplies an additive, and a mixing blower 56. The mixing device 50 may also have a conduit 54 through which the web material MC and additive are conveyed.

One or more additive cartridges 52a storing additives are installed to the additive supplier 52. The additive cartridges 52a may be removably installed to the additive supplier 52. The additive supplier 52 includes an additive extractor 52b that extracts additive from the additive cartridges 52a, and an additive injector 52c that injects the additive extracted by the additive extractor 52b into the conduit 54.

The additive extractor 52b feeds additive in an additive cartridges 52a to the additive applicator 52c by means of a feeder not shown in the figure.

The additive injector 52c has a shutter that opens and closes, and when the shutter is open, the additive extracted by the additive extractor 52b is fed into the conduit 54.

The additive includes resin for binding multiple fibers together. The resin contained in the additive functions as a binder, melts when passing through the sheet former 80, for example, and binds together multiple fibers contained in the web material MC.

The additive supplied may also contain components other than resin for binding fibers. For example, the additive may also include a coloring agent, an anti-blocking agent to prevent agglomeration of fibers or agglomeration of resin, or a flame retardant for making the fiber difficult to burn. The additive may also be in the form of fibers or powder.

The mixing blower 56 produces an air current flowing through a conduit 54 connecting conduit 7 to the distributor 60, and mixes the web material MC with the additive.

The mixing blower 56 in this example is configured with a motor, blades that turn as driven by the motor, and a case housing the blades. In addition to blades for producing an air current, the mixing blower 56 may also include a mixer for mixing the web material MC and the additive.

The mixture mixed by the mixing device 50 is referred to below as mixture MX. The mixture MX is an example of material containing fiber. The mixture MX is conveyed to the distributor 60 and introduced to the distributor 60 by the air current produced by the mixing blower 56.

The distributor 60 detangles the fibers in the mixture MX, and the detangled fibers are dispersed in air while descending to the second web former 70. If the additive supplied from the additive supply device 52 is fibrous, these additive fibers are also detangled by the distributor 60 and descend to the second web former 70.

The distributor 60 includes a dispersing drum 61, and a housing 63 that houses the dispersing drum 61. The dispersing drum 61 is a cylindrical structure configured similarly to the drum 41 described above, for example, rotates as driven by a motor (not shown in the figure) similarly to the drum 41, and functions as a sieve. The dispersing drum 61 has openings, and the mixture MX detangled by rotation of the dispersing drum 61 falls through the openings. As a result, the mixture MX descends from the drum 61 in the internal space 62 formed inside the housing 63. The housing 63 is equivalent to a case.

The second web former 70 is located below the dispersing drum 61. The second web former 70 in this example includes a mesh belt 72, tension rollers 74, and a suction mechanism 76.

The mesh belt 72 is an endless metal belt similar to the mesh belt 46 described above, and is mounted around multiple tension rollers 74. The mesh belt 72 circulates in a path configured by the tension rollers 74, and moves in the conveyance direction indicated by the arrow F1. Part of the path of the mesh belt 72 is flat in the area below the dispersing drum 61, and the mesh belt 72 forms a flat surface.

In the flat part of the path of the mesh belt 72, the conveyance direction F1 matches the conveyance direction F2 of the second web W2. Many holes are also formed in the mesh belt 72.

Components of the mixture MX falling from the dispersing drum 61 located above the mesh belt 72 that are larger than the openings in the mesh belt 72 accumulate on the mesh belt 72. Components of the mixture MX that are smaller than the openings in the mesh belt 72 pass through the holes.

The suction mechanism 76 suctions air from the opposite side of the mesh belt 72 as the dispersing drum 61. Material that passes through the openings in the mesh belt 72 is pulled into the suction mechanism 76. The air current suctioned by the suction mechanism 76 pulls the mixture MX falling from the dispersing drum 61 to the mesh belt 72, and effectively promotes accumulation of the mixture.

The air current suctioned by the suction mechanism 76 creates a down flow in the path of the mixture MX descending from the dispersing drum 61, and can be expected to have the effect of preventing precipitating fibers from becoming tangled. The mixture accumulated on the mesh belt 72 is laid in a web, forming a second web W2.

The mesh belt 72 functions as an accumulator and a conveyor, and the surface of the mesh belt 72 is equivalent to a conveyance surface. The second web W2 is an example of a web according to the invention, and accumulated product.

A second collection blower 68 is connected to the suction mechanism 76 through a conduit 66 and a second dust collector 67. The second collection blower 68 suctions air from the suction mechanism 76. The second dust collector 67 is a filter. The air current the second collection blower 68 generates passes through the conduit 66 to the second dust collector 67, and fiber and particles contained in the air current are trapped in the second dust collector 67. The air current passing the second dust collector 67 then passes from the second collection blower 68 through a discharge conduit not shown, and is discharged from the sheet manufacturing apparatus 100.

The distributor 60 also has a first seal roller 64 and a second seal roller 65. An opening 637 through which the mesh belt 72 enters the internal space 62 is formed at the upstream end of the housing 63 in the conveyance direction F1. Another opening 638 through which the mesh belt 72 and the second web W2 are discharged from the internal space 62 is formed at the downstream end of the housing 63 in the conveyance direction F1. The opening 638 is an example of a discharge opening (exit).

The first seal roller 64 is a roller that contacts the mesh belt 72 at the opening 637. The first seal roller 64 closes the gap formed around the mesh belt 72 at the opening 637.

The second seal roller 65 is a roller that contacts the second web W2 on the mesh belt 72 at the opening 638. The second seal roller 65 closes the gap around the mesh belt 72 and the second web W2 at the opening 638.

The first seal roller 64 and second seal roller 65 do not completely close the openings 637, 638, but effectively suppress the flow of air through the openings 637, 638. More specifically, the first seal roller 64 and second seal roller 65 have the effect of limiting the air current flowing from the openings 637, 638 to the suction mechanism 76. As a result, the air current suctioned by the suction mechanism 76 can more effectively suction the mixture MX inside the internal space 62.

A measurement device 400 for measuring the thickness of the second web W2 is disposed to the distributor 60 on the downstream side in the conveyance direction F1.

The measurement device 400 has an optical detector 401 for measuring the thickness of the second web W2 conveyed to the outside from the distributor 60. The measurement device 400 in this example may be configured with an optical rangefinder that measures distance using light, or a contact sensor that contacts the second web W2. In this embodiment, the measurement device 400 uses an optical rangefinder that measures distance by emitting a light beam and detecting the reflection as the optical detector 401. The optical detector 401 may be a laser rangefinder that emits a laser beam and detects the laser beam reflected from the target (second web W2), or an infrared rangefinder that emits an infrared beam and detects the infrared reflection.

The measurement device 400 measures the thickness of the second web W2 directly or indirectly by means of the optical detector 401. The optical detector 401 connects to a controller 110 that controls operation of the sheet manufacturing apparatus 100. The optical detector 401 executes measurements related to the second web W2, and outputs the result to the controller 110. As a result, the controller 110 can measure the thickness of the second web W2 and acquire the detected thickness continuously during the operation of manufacturing a sheet S.

A wetting device 78 is disposed to the conveyance path of the mesh belt 72 downstream from the distributor 60. The wetting device 78 is a mist humidifier that produces and supplies a water mist to the mesh belt 72, and in this example has a tank that holds water, and an ultrasonic vibrator that converts the water to mist. Because the moisture content of the second web W2 can be adjusted by the mist supplied by the wetting device 78, the mist can suppress accretion of fiber on the mesh belt 72 due to static electricity.

The second web W2 is then conveyed by the conveyor 79, separates from the mesh belt 72, and is conveyed to the former 80. The conveyance direction of the second web W2 is conveyance direction F2. The conveyor 79 in this example has a mesh belt 79a, rollers 79b, and a suction mechanism 79c.

The suction mechanism 79c has a blower not shown, and produces an air current flowing upward through the mesh belt 79a by the suction of the blower.

The mesh belt 79a is configured by an endless metal belt with numerous openings in the same way as the mesh belt 46 and mesh belt 72. The mesh belt 79a moves by rotation of the rollers 79b and moves along a circulating path. The second web W2 is separated from the mesh belt 72 and pulled to the mesh belt 79a by the suction force of the suction mechanism 79c in the conveyor 79. The second web W2 moves with the mesh belt 79a and is conveyed to the former 80.

The former 80 has a compression device 82 and a heating device 84. The compression device 82 compresses the second web W2 with a specific nip pressure, adjusts the thickness of the second web W2, and changes the density of the second web W2. By applying heat to the second web W2, the heating device 84 binds the fibers derived from the web material MC contained in the second web W2 through the resin contained in the additive.

The compression device 82 comprises a pair of calender rolls 85. The compression device 82 has a hydraulic press mechanism that applies nip pressure to the calender rolls 85, and a motor that causes the calender rolls 85 to rotate.

The heating device 84 includes a pair of heat rollers 86. The heating device 84 also has a heater (not shown in the figure) that heats the surface of the heat rollers 86 to a specific temperature, and a motor (not shown in the figure) that causes the heat rollers 86 to rotate in the direction of the sheet cutter 90. The second web W2 is heated in the heating device 84 to a temperature greater than the glass transition temperature of the resin contained in the mixture MX, forming a sheet S.

The sheet cutter 90 cuts the sheet S formed by the former 80. In this example, the sheet cutter 90 has a first cutter 92 that cuts the sheet S crosswise to the conveyance direction of the sheet S indicated by the arrow F2 in the figure, and a second cutter 94 that cuts the sheet S parallel to the conveyance direction F2.

The sheet cutter 90 cuts the length and width of the sheet S to a specific size, forming single sheets S. The single sheets S cut by the sheet cutter 90 are then stored in the discharge tray 96. The discharge tray 96 may be a tray or stacker for holding the manufactured sheets, and the sheets S discharged to the tray can be removed and used by the user.

The defibration process unit 101 and sheet maker 102 of the sheet manufacturing apparatus 100 described in this example are configured as an integrated unit, but may be disposed separately. The web material MC and first web W1 produced by the defibration process unit 101 may be removed from the sheet manufacturing apparatus 100 and stored, or it may also be sealed in specific packages in a form ready for shipping or sale. In this case, the sheet maker 102 may be configured to manufacture sheets S by processing the first web W1 or web material MC that is stored or is sealed in packages.

1-2. Distributor Configuration

Figure 2:
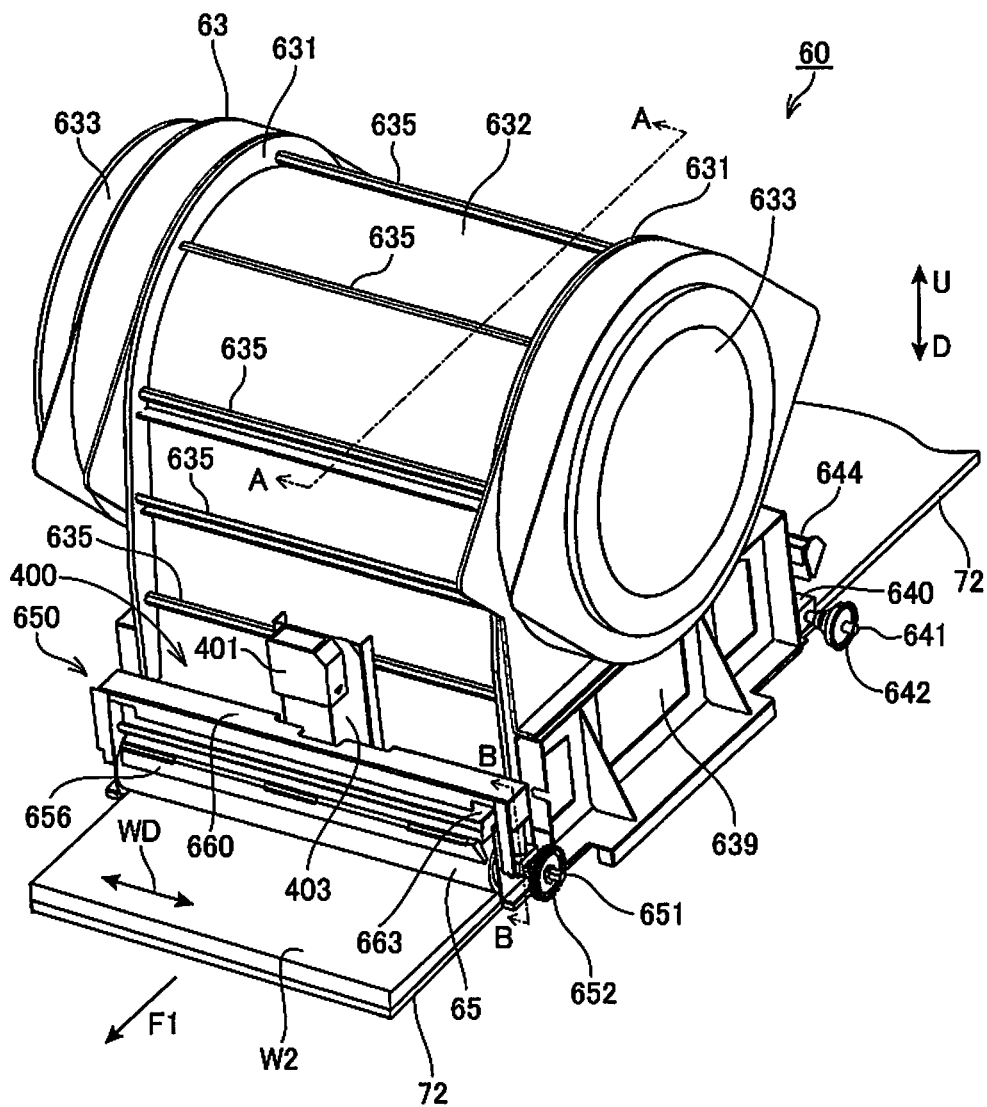
FIG. 2 is an oblique view of the distributor in the first embodiment of the invention.
Figure 3:
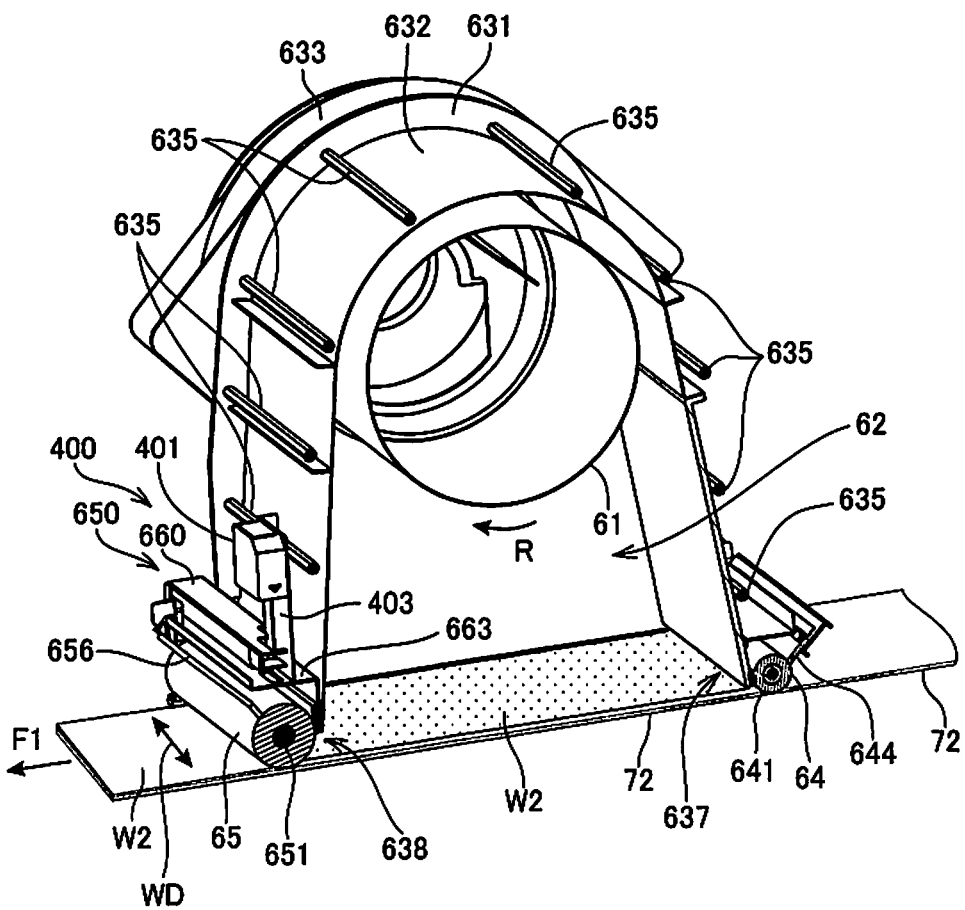
FIG. 3 is a section view of the distributor in the first embodiment of the invention.

FIG. 2 is a perspective view of the distributor 60. In FIG. 2 arrow U indicates the direction up or above, and arrow D indicates the direction down or below, the sheet manufacturing apparatus 100 when in the operating position. The left side as seen in FIG. 2 corresponds to the downstream side in the conveyance direction F1. FIG. 3 is a section view of the distributor 60 through line A-A in FIG. 2.

In FIG. 2, FIG. 3, and other figures referenced below, the direction across the width of the second web W2 is indicated by arrow WD. The width direction WD is a direction intersecting the conveyance direction F1, and is preferably perpendicular to the conveyance direction F1.

The housing 63 is configured by a pair of frame members 631 and a housing assembly 632 disposed between the frame members 631. The housing assembly 632 configures the roof and sides of the housing 63. A side panel unit 633 is attached to each of the pair of frame members 631, and a lower side panel 639 is disposed below the side panel units 633. A closed internal space 62 is formed by the housing assembly 632, side panel units 633, and lower side panels 639. The pair of frame members 631 are connected together by multiple connection shafts 635, and are affixed in unison with the housing assembly 632.

As shown in FIG. 3, the distribution drum 61 is housed in the internal space 62 formed by the housing 63. The distribution drum 61 is a cylindrical member with multiple openings not shown, and the mixture MX from the mixing blower 56 shown in FIG. 1 is fed into the space inside the distribution drum 61. The distribution drum 61 is supported rotatably in the internal space 62 by bearings not shown disposed to the side panel units 633, and a drive mechanism. The direction of rotation of the distribution drum 61 in this example is indicated by arrow R in FIG. 3, but the distribution drum 61 may turn in the opposite direction, or the direction of rotation may be changed.

In conjunction with rotation of the distribution drum 61, the mixture MX falls from the distribution drum 61 inside the internal space 62 to the mesh belt 72, and the mixture MX accumulated on the mesh belt 72 forms a second web W2.

A roller frame 640 that supports the first seal roller 64 is disposed on the upstream side of the housing 63 in the conveyance direction F1.

The roller frame 640 is affixed to the frame members 631 or lower side panels 639, and supports a roller shaft 641, which is the rotational axis of the first seal roller 64. As described above, the first seal roller 64 is disposed on the outside of the housing 63 to close the opening 637 formed at the bottom of the housing 63.

A gear 642 that connects to a motor or drive gear not shown is disposed to the roller shaft 641, and the first seal roller 64 is driven by rotation of the gear 642. A first cleaner 644 is also disposed to the roller frame 640.

The first cleaner 644 has a synthetic resin or rubber blade that contacts the surface of the first seal roller 64, and wipes fiber and particles sticking to the first seal roller 64 by means of the blade.

A roller unit 650 including the second seal roller 65 is disposed to the downstream side of the housing 63 in the conveyance direction F1. The roller unit 650 includes the second seal roller 65 and a second cleaner 656, and a support mechanism that supports the second seal roller 65.

As described above, the second seal roller 65 is disposed on the outside of the housing 63 to close the opening 638 formed at the bottom of the housing 63.

The second cleaner 656 has a synthetic resin or rubber blade that contacts the surface of the second seal roller 65, and wipes fiber and particles sticking to the second seal roller 65 by means of the blade.

1-3. Roller Unit Construction

Figure 4:
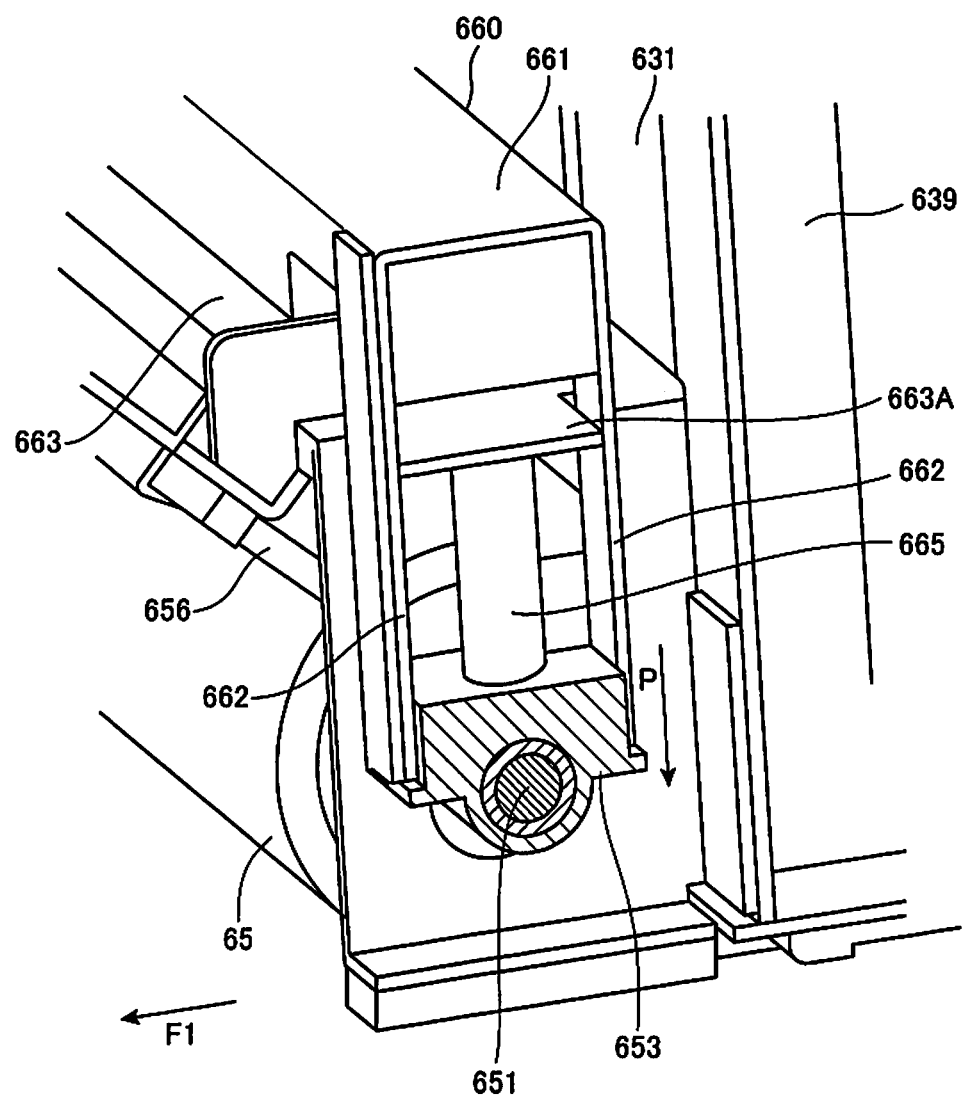
FIG. 4 is an oblique section view of a roller unit in the first embodiment of the invention.
Figure 5:
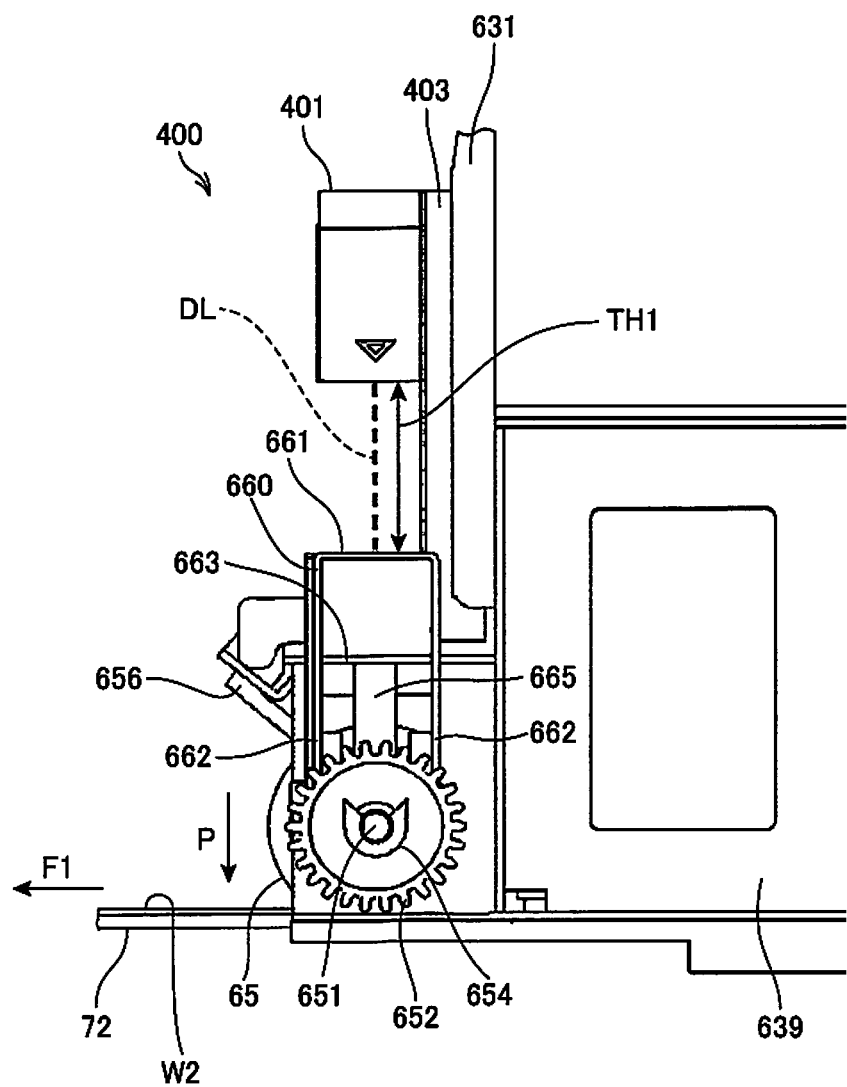
FIG. 5 is a side section view of the measuring unit and the roller unit in the first embodiment of the invention.

FIG. 4 is a section view showing main parts of the roller unit 650 through line B-B in FIG. 2. FIG. 5 is a side section view showing main parts of the measurement device 400 and roller unit 650. The support structure of the second seal roller 65 is described below with reference to FIG. 4, FIG. 5, FIG. 2, and FIG. 3.

The support structure that supports the second seal roller 65 includes a bearing block 653, a roller frame 660, a subframe 663, and a coil spring 665.

The subframe 663 is a frame affixed to the frame members 631. As shown in FIG. 3, the subframe 663 is disposed at the bottom of the housing 63. The subframe 663 extends in the width direction WD, is positioned between the pair of frame members 631, and is fastened to each of the two frame members 631. The subframe 663 protrudes to the downstream side in the conveyance direction F1 from the top surface 661, and supports various members as described below.

The roller frame 660 is an open frame that supports a roller shaft 651, which is the rotational axis of the second seal roller 65.

As shown in FIG. 2, a gear 652 is disposed to the roller shaft 651. The gear 652 connects to a motor or drive gear not shown, and the roller shaft 651 turns by means of torque transferred to the gear 652. The second seal roller 65 is driven through the gear 652, and turns at a rotational speed corresponding to the speed of mesh belt 72 movement in the conveyance direction F1. In other words, the controller 110 controls the speed the second web W2 accumulated on the mesh belt 72 moves in the conveyance direction F1, and the speed of the movement of the surface of the second seal roller 65, to substantially the same speed. As a result, the second seal roller 65 contacting the second web W2 does not disturb the surface of the second web W2, the second seal roller 65 does not interfere with conveyance of the second web W2, and the second web W2 can be consistently conveyed.

The roller frame 660 rotationally supports the second seal roller 65, and is disposed to the subframe 663 to so that the roller frame 660 can move up and down in conjunction with the second seal roller 65.

The roller frame 660 has a top surface 661 that extends in the width direction WD. A pair of side walls 662 are connected to the ends of the top surface 661 in the width direction WD as shown in FIG. 4. As a result, the roller frame 660 is U-shaped in section with the bottom end open. A flange 663A of the subframe 663 is inserted between the pair of side walls 662. The flange 663A is a protrusion formed extending in the width direction WD from the ends of the subframe 663.

A bearing block 653 that supports the roller shaft 651 is fit and fastened between the side walls 662 in the opening at the end of the roller frame 660. The bearing block 653 is a bearing that supports the roller shaft 651 to rotate freely, and in this example supports the roller shaft 651 through a bearing not shown.

A gear 652 is fit on the end of the roller shaft 651, and as shown in FIG. 5 the gear 652 is fastened to the roller shaft 651 by a retaining ring 654.

The bearing block 653 is connected to the subframe 663 through a coil spring 665. The coil spring 665 is a compression spring, expands between the subframe 663 and the bearing block 653, and applies urging force to the subframe 663 and bearing block 653. Because the subframe 663 is fastened to the frame members 631, the urging force of the coil spring 665 works as pressure pushing the bearing block 653 to the second web W2. The direction in which this pressure works is indicated by arrow P in the figures.

The roller frame 660 is supported on the subframe 663 through the second seal roller 65 and the coil spring 665. As a result, the roller frame 660 can move with the second seal roller 65 in the extension range of the coil spring 665.

The coil spring 665 is an example of a displacement member.

FIG. 4 and FIG. 5 show the configuration at one end of the roller unit 650 in the width direction WD, but the same configuration is also disposed at the other end of the roller unit 650. More specifically, both ends of the second seal roller 65 are supported by a bearing block 653, and each of the two bearing blocks 653 is connected through a coil spring 665 to the subframe 663.

Therefore, the second seal roller 65 and the roller frame 660 that supports the second seal roller 65 are respectively supported through coil springs 665 at both ends of the second seal roller 65 in the width direction WD.

The second seal roller 65 contacts the second web W2 from above. The weight of the second seal roller 65 and roller frame 660, and the urging force of the coil spring 665, both work as pressure in the downward direction P on the second web W2. In this event, the second seal roller 65 works as a pressure roller.

Inside the internal space 62 there is a large amount of air between the fibers contained in the second web W2, the fibers are randomly oriented, and the second web W2 is generally soft and fluffy. There are also numerous peaks and valleys in the top surface of the second web W2.

The density of the second web W2 is increased by being compressed as it passes through the opening 638. The smoothness of the surface of the second web W2 is also increased by the peaks and valleys in the surface being compressed.

The pressure the second seal roller 65 applies to the second web W2 is less than the pressure the compression device 82 shown in FIG. 1 applies to the second web W2. The compression device 82 compresses the second web W2 to a high density to make a sheet S. If the sheets S are processed into plain paper with grammage of 60 g/m$^2$ to 80 g/m$^2$, the thickness ranges from approximately 0.08 mm to 0.14 mm. The thickness to which the second web W2 is compressed by the sheet former 80 is equivalent to the thickness of the sheets S.

Note that the compression device 82 is an example of a second compression device.

Because the pressure the second seal roller 65 applies to compress the second web W2 is lower than the pressure applied by the sheet former 80, the thickness of the second web W2 after passing through the second seal roller 65 is much greater than the thickness of the sheets S. The thickness of the second web W2 after passing through the second seal roller 65 is measured by the optical detector 401.

The purpose of the sheet manufacturing apparatus 100 measuring the thickness of the second web W2 by the optical detector 401 as controlled by the controller 110 is to measure and detect variation in the amount of fiber accumulated by the second web former 70. In this embodiment of the invention the sheet manufacturing apparatus 100 measures the thickness of the second web W2 using a single optical detector 401. This configuration enables detecting variation in the thickness of the second web W2 in the conveyance direction F1 based on change over time in the measurements (output values) of the optical detector 401.

The thickness of the second web W2 is an indicator of how much fiber has accumulated in the internal space 62. Based on the measurement output by the optical detector 401, the controller 110 can adjust the rotational speed of the drum 41 and the amount of mixture MX supplied to the drum 41, and thereby appropriately adjust the thickness of the second web W2. As a result, the thickness of the second web W2 can be kept within a desirable range, variation in the thickness can be suppressed, and the quality of the sheet S can be stabilized.

If the second seal roller 65 compresses the second web W2 with approximately the same pressure as the sheet former 80, the thickness of the second web W2 will also be compressed greatly compared with the internal space 62, and the amount of variation in the thickness of the second web W2 will also be reduced. As a result, detecting the thickness of the second web W2 with great accuracy is difficult.

There is also no need to compress the second web W2 with great pressure in the process from the distributor 60 to the sheet former 80. Therefore, the second seal roller 65 compressing the second web W2 with less pressure than applied by the sheet former 80 is an effective and efficient means of accurately detecting variation in the thickness of the second web W2.

1-4. Configuration of a Thickness Measuring Device

The construction and operation of a configuration for measuring the thickness of the second web W2 with a optical detector 401 is described below.

The measurement device 400 includes a optical detector 401, and an attachment fixture 403 that supports the optical detector 401.

As shown in FIG. 3, the attachment fixture 403 is a bracket that connects the subframe 663 and the optical detector 401, and is affixed to the subframe 663. As a result, the optical detector 401 is affixed to the housing 63 of the distributor 60. As described above, however, the roller frame 660 can move with the second seal roller 65 relative to the housing 63.

The light beam the optical detector 401 uses to measure distance is indicated by dotted line DL in FIG. 5. The measurement beam DL is emitted from the optical detector 401 toward the top surface 661 of the roller frame 660. In other words, the measurement device 400 in this embodiment of the invention measures distance TH1 between the optical detector 401 and the top surface 661 by means of the optical detector 401.

Because the roller frame 660 is displaced with the second seal roller 65 according to the thickness of the second web W2, the distance TH1 between the top surface 661 and the optical detector 401 changes according to the thickness of the second web W2. Measurement by the optical detector 401 can therefore be said to be a measurement of the thickness of the second web W2.

In this embodiment of the invention the optical detector 401 is disposed to approximately the center of the second web W2 in the width direction WD. The controller 110 can therefore detect change in the thickness of the second web W2 in the conveyance direction F1 based on change over time in the measurement output by the optical detector 401.

As described above, a sheet manufacturing apparatus 100 according to the first embodiment of the invention includes a distributor 60 that disperses and distributes a mixture MX of material containing fiber, and a mesh belt 72 that accumulates the mixture MX dispersed by the distributor 60.

The sheet manufacturing apparatus 100 also has a roller unit 650 as a compression device that compresses the second web W2 accumulated on the mesh belt 72, and a optical detector 401 that measures the thickness of the second web W2. The optical detector 401 measures the thickness of the second web W2 after compression by the roller unit 650.

The roller unit 650 is an example of a compression device and a first compression device.

A sheet manufacturing apparatus 100 employing a thickness measuring device and a fibrous feedstock recycling device according to the invention can measure the thickness of the second web W2 of accumulated fiber under stable conditions by compressing the second web W2. As a result, variation in the thickness of the second web W2 in the conveyance direction F1, and variation in the thickness of the second web W2 in a width direction WD intersecting the conveyance direction F1, can be detected with great accuracy.

The sheet manufacturing apparatus 100 applying the measurement method of the invention is a device that disperses a mixture MX, accumulates the dispersed mixture MX, and forms a second web W2, and measures the thickness of the second web W2 while compressing the second web W2. As a result, the thickness of the second web W2 of accumulated fiber can be measured under stable conditions by compressing the second web W2. As a result, variation in the thickness of the second web W2 can be detected with great accuracy.

Furthermore, because the optical detector 401 measures the thickness of the second web W2 after the second web W2 is compressed by the roller unit 650, the effects of roughness (peaks and valleys) in the surface of the second web W2 can be suppressed, and the thickness can be measured with great accuracy.

The sheet manufacturing apparatus 100 also has a second seal roller 65 that contacts the second web W2 and compresses the second web W2, and a roller frame 660 that displaces the second seal roller 65 according to the thickness of the second web W2. The optical detector 401 measures the displacement of the second seal roller 65.

As a result, the thickness of the second web W2 can be measured with great accuracy by measuring the displacement of the second seal roller 65, which is displaced according to the thickness of the second web W2. By using the roller unit 650, the compression and the thickness of the second web W2 can both be measured.

The distributor 60 is configured to disperse material inside a housing 63 by means of a distribution drum 61 enclosed in a housing 63, which is a case. The second seal roller 65 is disposed to an opening 638, which is a discharge opening (exit) through which the second web W2 is discharged from the housing 63. As a result, a soft second web W2 of mixture MX accumulated inside the internal space 62 can be compressed at the opening 638, and its thickness can be measured with great accuracy.

The sheet manufacturing apparatus 100 also has a distributor 60 that disperses material containing fiber. The sheet manufacturing apparatus 100 also has a mesh belt 72 that accumulates material dispersed by the distributor 60 and forms a web, and a roller unit 650 as a first compression device that compresses the web. The sheet manufacturing apparatus 100 also has a measurement device 400 that measures the thickness of the web after being compressed by the roller unit 650. The sheet manufacturing apparatus 100 also has a compression device 82 as a second compression device that, after compression by the roller unit 650 and measurement by the measurement device 400, further compresses the second web W2 that was compressed by the roller unit 650.

This configuration enables compressing the second web W2 and measuring the thickness of the second web W2 of accumulated fiber under stable conditions before the second web W2 is again compressed by the compression device 82. As a result, variation in the thickness of the second web W2 in the conveyance direction F1, and variation in the thickness of the second web W2 in a width direction WD intersecting the conveyance direction F1, can be detected with great accuracy.

In addition, because the thickness of the second web W2 is measured in the distributor 60 in a process before compression by the compression device 82, variation in the amount of mixture MX accumulated on the mesh belt 72 in the distributor 60 can be quickly detected. As a result, the operating conditions of the distributor 60 can be controlled by the controller 110 to adjust only the thickness of the second web W2, operation can be quickly adapted to variation in the thickness of the second web W2, and consistent quality in the sheet S can be promoted.

Furthermore, because the roller unit 650 compresses the web with lower pressure than applied by the compression device 82, the second web W2 can be compressed sufficiently to smoothen and level roughness in the surface of the second web W2, and variation in the thickness of the second web W2 can be measured under favorable conditions.

2. Embodiment 2

Figure 6:
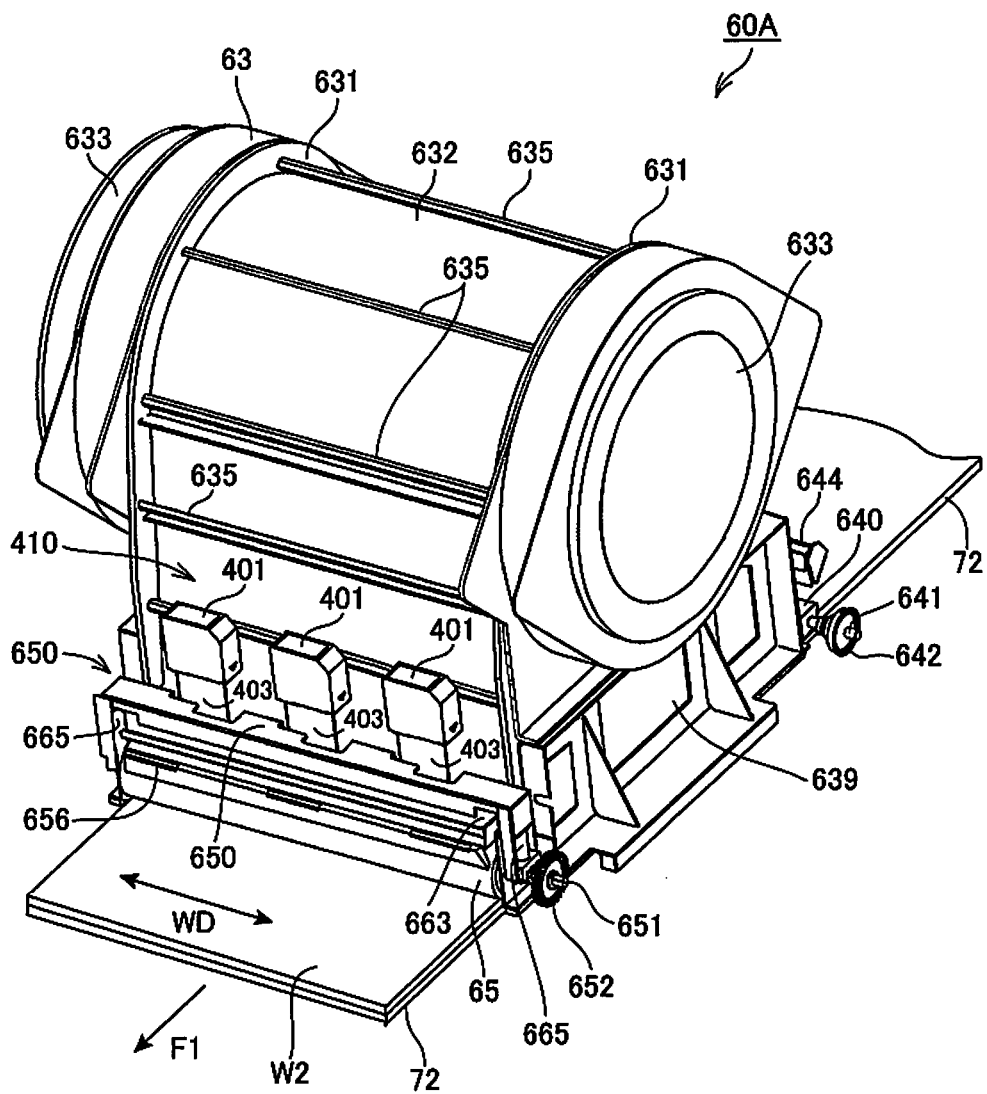
FIG. 6 is an oblique view of the distributor in a second embodiment of the invention.

FIG. 6 schematically illustrates the configuration of a distributor 60A according to the second embodiment of the invention.

This distributor 60A is used in the sheet manufacturing apparatus 100 instead of the distributor 60 described above. The distributor 60A has a housing 63 configured as described in the distributor 60 above, causes mixture MX to precipitate from the distribution drum 61 inside the housing 63 and accumulate on the mesh belt 72, forming a second web W2.

The distributor 60A uses a measurement device 410 instead of the measurement device 400 described in the first embodiment above. Because the configuration other than the measurement device 410 is the same as the distributor 60 described above, the same reference numerals are used and further description thereof is omitted.

The measurement device 410 includes multiple optical detectors 401 disposed along the width direction WD. This embodiment of the invention shows an example having three optical detectors 401, but the number of optical detectors 401 is not specifically limited and there may be more or only two.

Each of the optical detectors 401 is connected and affixed to the subframe 663 through the attachment fixture 403. As a result, while each of the optical detectors 401 is affixed to the housing 63, the second seal roller 65 of the roller unit 650 displaces according to the thickness of the second web W2 as in the first embodiment.

The measurement device 410 measures the distance to the top surface 661 by each of the three optical detectors 401. The optical detectors 401 output to the controller 110. In other words, the measurement device 410 measures the thickness of the second web W2 at different positions across the width direction WD.

As described in the first embodiment, the roller unit 650 is supported on the subframe 663 at both ends of the second seal roller 65 in the width direction WD by coil springs 665. The two coil springs 665 disposed at one end of the second seal roller 65 and the other end can expand and contract independently. As a result, the lengths of the two coil springs 665 may be different, and the second seal roller 65 may therefore be inclined across the width direction WD. More specifically, when the thickness of the second web W2 is not uniform across the width direction WD, the second seal roller 65 slopes across the width direction WD.

Because the top surface 661 is sloped when the second seal roller 65 is sloped, the measurements detected by the three optical detector 401 are also different. When the measurements from the three optical detectors 401 are different, the controller 110 detects that the top surface 661 is sloped.

The distributor 60A configured as described above has the same operational effect as the distributor 60 in the first embodiment.

In addition, in a sheet manufacturing apparatus 100 employing the fibrous feedstock recycling device, web processing device, and fiber feedstock recycling method of the invention, the configuration using the distributor 60A measures the thickness of the second web W2 by optical detectors 401 at multiple positions along the width direction WD.

More specifically, the measurement device 410 has multiple optical detectors 401 disposed parallel to a direction intersecting the conveyance direction of the second web W2. The measurement device 410 measures the thickness of the second web W2 by each of the multiple optical detectors 401.

As a result, based on the measurements taken by the multiple optical detectors 401, incline in the second seal roller 65 in the width direction WD can be detected, and variation in the thickness of the second web W2 along the width direction WD can be detected.

3. Embodiment 3

Figure 7:
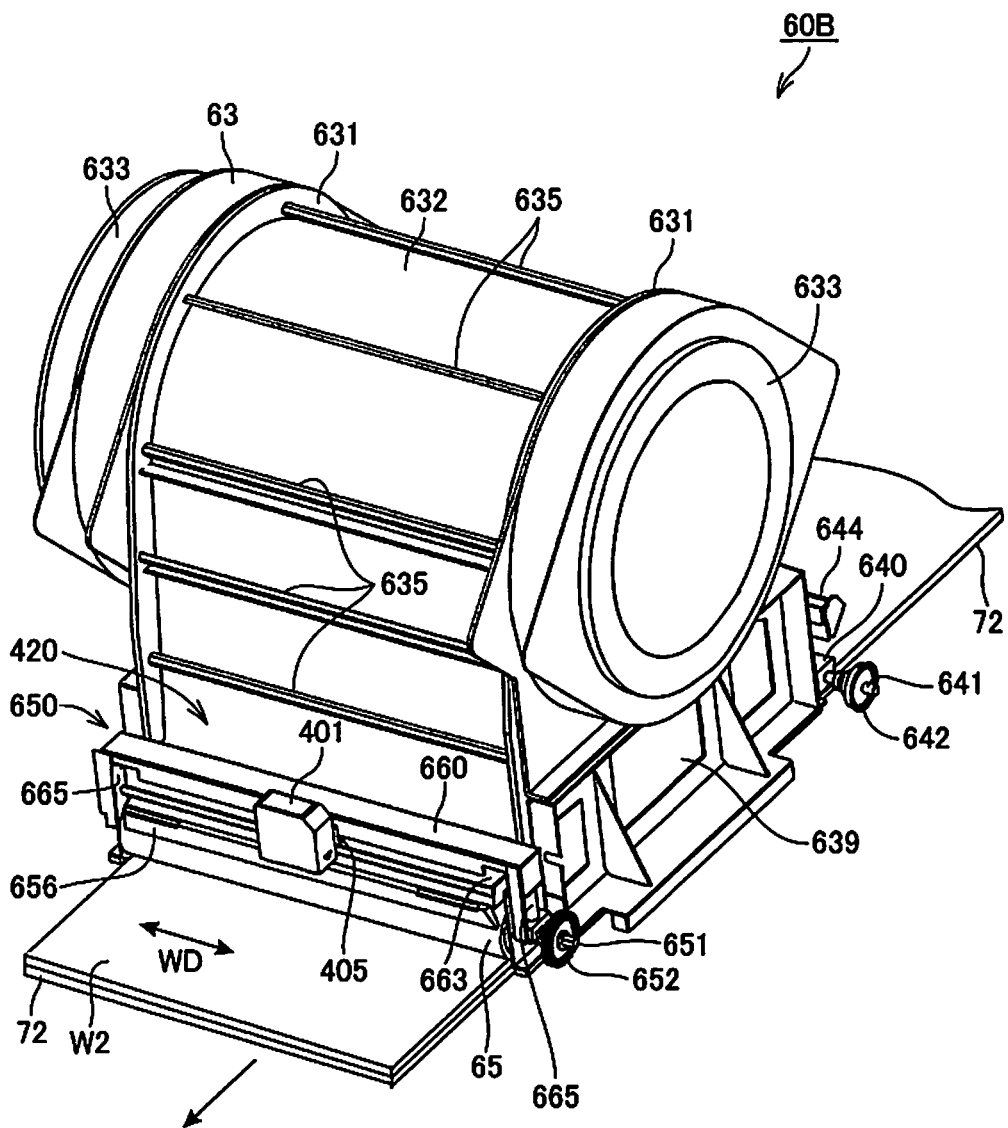
FIG. 7 is an oblique view of the distributor in a third embodiment of the invention.
Figure 8:
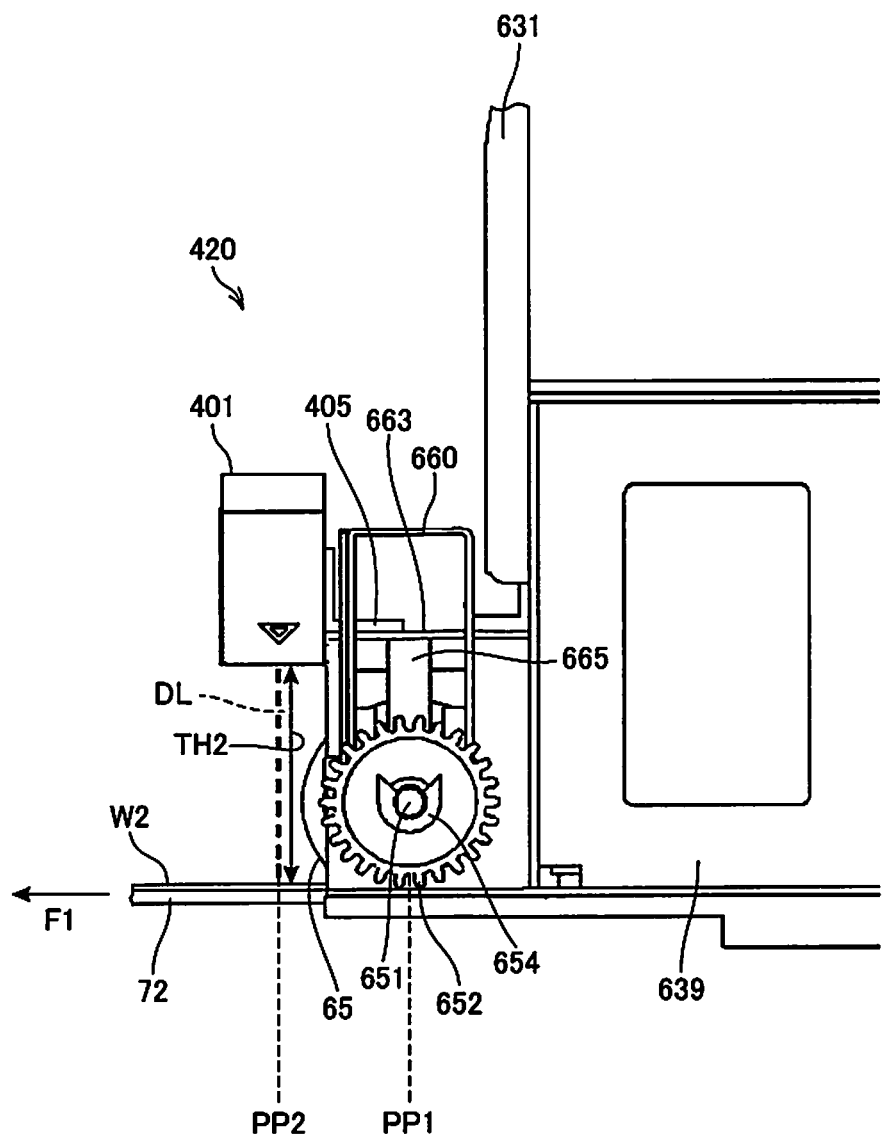
FIG. 8 is a side section view of main parts in the measuring unit in the third embodiment of the invention.

FIG. 7 schematically illustrates the configuration of a distributor 60B according to the third embodiment of the invention. FIG. 8 is a side section view of main parts of the measurement device 420 in the third embodiment of the invention.

This distributor 60B is used in the sheet manufacturing apparatus 100 instead of the distributor 60 described above. The distributor 60B has a housing 63 configured as described in the distributor 60 above, and causes mixture MX to precipitate from the distribution drum 61 inside the housing 63 and accumulate on the mesh belt 72, forming a second web W2.

The distributor 60B uses a measurement device 420 instead of the measurement device 400 described in the first embodiment above. Because the configuration other than the measurement device 420 is the same as the distributor 60 described above, the same reference numerals are used and further description thereof is omitted.

The measurement device 420 affixes the optical detector 401 by means of an attachment fixture 405 connected to the subframe 663. As shown in FIG. 8, the attachment fixture 405 protrudes from the subframe 663 to the downstream side in the conveyance direction F1. The optical detector 401 is affixed to the attachment fixture 405 on the downstream side of the roller frame 660 in the conveyance direction F1.

The measurement beam DL emitted by the optical detector 401 is emitted directly to the surface of the second web W2. As a result, the optical detector 401 measures the distance TH2 from the 401 to the second web W2.

As described in the first embodiment, the roller unit 650 compresses the second web W2 by the weight of the second seal roller 65 and the roller frame 660, and the urging force of the coil spring 665.

The position PP2 where the optical detector 401 measures the distance TH2 is downstream in the conveyance direction F1 from the position PP1 where the second seal roller 65 compresses the second web W2. Therefore, the optical detector 401 measures the thickness of the second web W2 after the second web W2 is compressed by the second seal roller 65.

The distributor 60B thus comprised has the same operational effect as the distributor 60 of the first embodiment.

The measurement device 410 of the distributor 60B measures the thickness of the second web W2 after the second web W2 is compressed by the roller unit 650. As a result, the thickness is measured after the second web W2 is compressed to a suitable density and roughness in the surface of the second web W2 is smoothened by the second seal roller 65. That is, the thickness of the second web W2 can be reliably measured with high accuracy because the measurement is taken after processing to a state enabling consistent measurement.

The sheet manufacturing apparatus 100 employing the fibrous feedstock recycling device, web processing device, and fiber feedstock recycling method of the invention includes in a configuration using the distributor 60B a mesh belt 72 as a conveyance surface on which a second web W2 is deposited. The sheet manufacturing apparatus 100 also has a second web former 70 as a conveyor for conveying the second web W2.

In this configuration, the optical detector 401 emits a measurement beam DL to the second web W2, and measures the thickness of the second web W2 referenced to the mesh belt 72 at a position opposite the mesh belt 72 side of the second web W2.

For example, the controller 110 holds or stores as a reference value the measurement of the distance TH2 taken by the optical detector 401 when a second web W2 is not being manufactured (when a second web W2 is not present). In this case, the controller 110 calculates the thickness of the second web W2 by subtracting the measurement of the distance TH2 taken by the optical detector 401 from the reference value. Because this configuration enables directly acquiring the thickness of the second web W2 in addition to variation in the thickness of the second web W2, whether or not the thickness of the second web W2 formed by the distributor 60 and second web former 70 is appropriate can be quickly determined.

4. Embodiment 4

Figure 9:
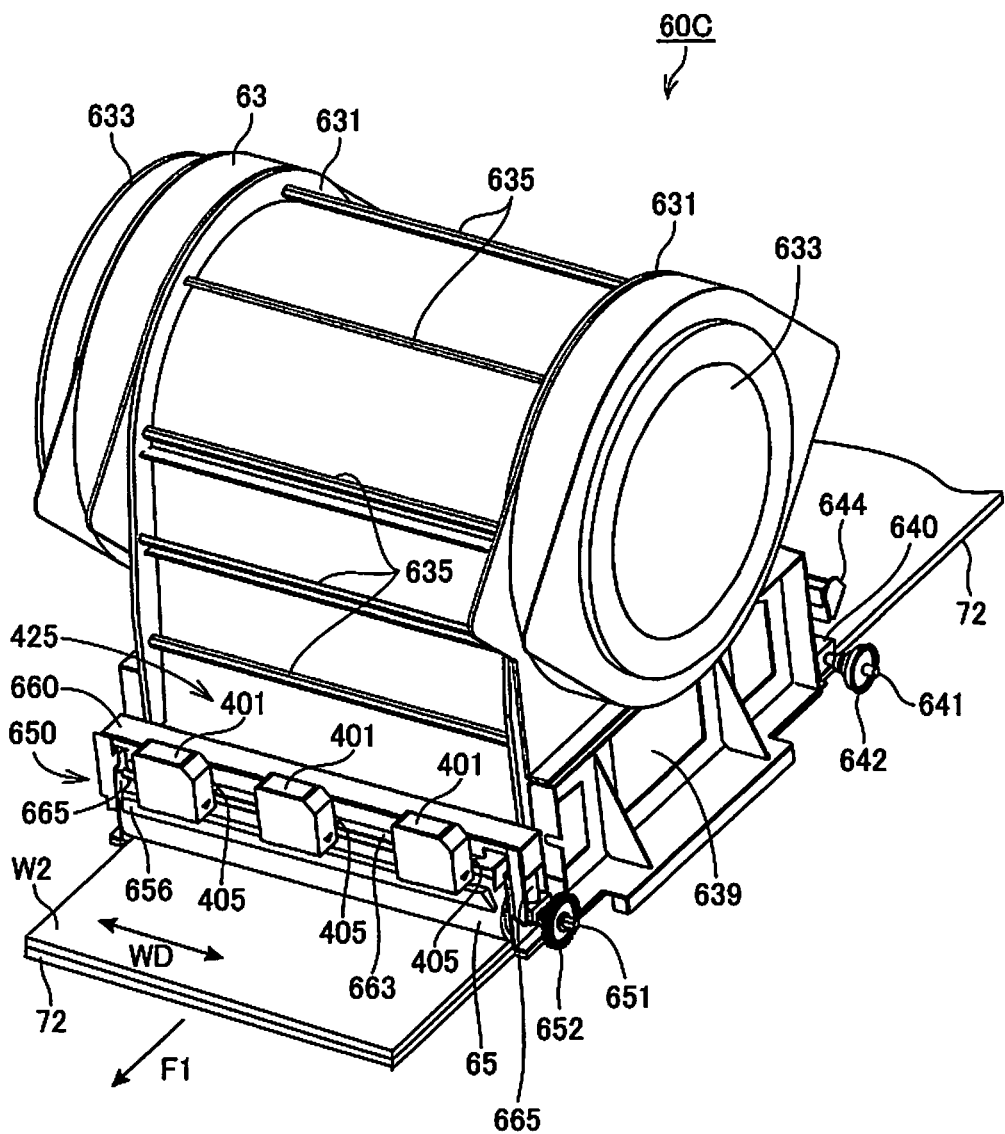
FIG. 9 is an oblique view of the distributor in a fourth embodiment of the invention.

FIG. 9 schematically illustrates the configuration of a distributor 60C according to the fourth embodiment of the invention.

This distributor 60C is used in the sheet manufacturing apparatus 100 instead of the distributor 60 described above. The distributor 60C has a housing 63 configured as described in the distributor 60 above, and causes mixture MX to precipitate from the distribution drum 61 inside the housing 63 and accumulate on the mesh belt 72, forming a second web W2.

The distributor 60C uses a measurement device 425 instead of the measurement device 420 described in the third embodiment above. Because the configuration other than the measurement device 425 is the same as the distributor 60 described above, the same reference numerals are used and further description thereof is omitted.

While the measurement device 420 in FIG. 7 is configured with one optical detector 401, this measurement device 425 is configured with multiple optical detectors 401 disposed along the width direction WD. This embodiment illustrates an example having three optical detectors 401, but may be configured with more optical detectors 401, or there may be only two.

Each of the optical detectors 401 is connected and affixed to the subframe 663 through an attachment fixture 405. As in the configuration of the measurement device 420 shown in FIG. 8, each of the optical detectors 401 is on the downstream side of the base 671 in the conveyance direction F1. Each of the optical detectors 401 emits a measurement beam DL to the surface of the second web W2, and measures the distance to the second web W2.

The measurement device 425 measures the distance to the second web W2 by each of the three optical detectors 401, and outputs the measurement to the controller 110. More specifically, the measurement device 425 measures the thickness of the second web W2 at different positions along the width direction WD. As a result, the controller 110 can detect the distribution of the thickness of the second web W2 in the width direction WD based on the measurements from the measurement device 425.

This distributor 60C has the same operational effect as the distributor 60 in the first embodiment and the distributor 60B of the second embodiment.

In addition, in a sheet manufacturing apparatus 100 employing the fibrous feedstock recycling device, web processing device, and fiber feedstock recycling method of the third embodiment of the invention, the measurement device 425 includes multiple optical detectors 401 disposed in a direction intersecting the conveyance direction of the second web W2. The measurement device 425 also measures the thickness of the second web W2 by the multiple optical detectors 401. As a result, the thickness of the second web W2 can be measured at different positions along the width direction WD, and information related to the distribution of the thickness along the width direction WD can be acquired.

5. Embodiment 5

Figure 10:
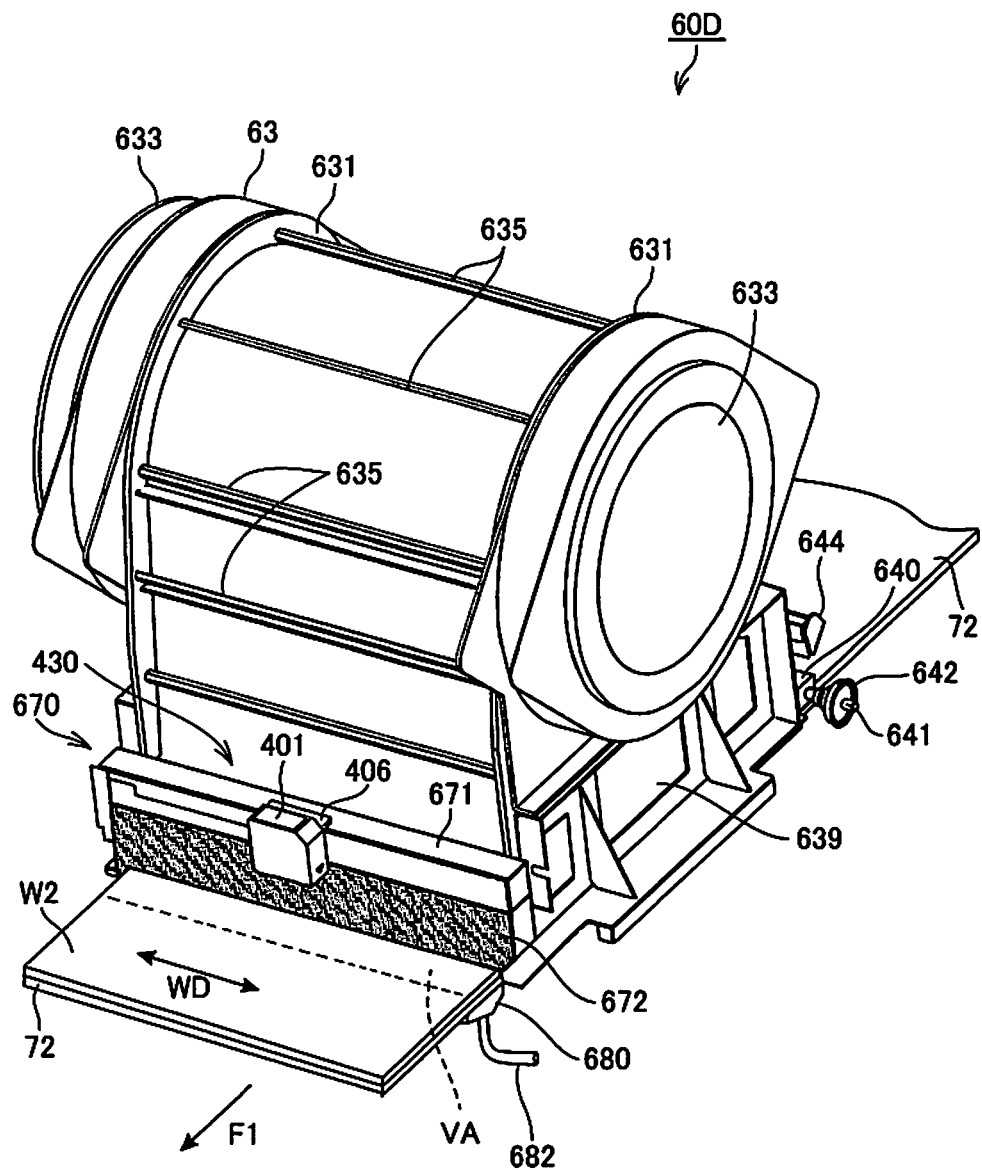
FIG. 10 is an oblique view of the distributor in a fifth embodiment of the invention.
Figure 11:
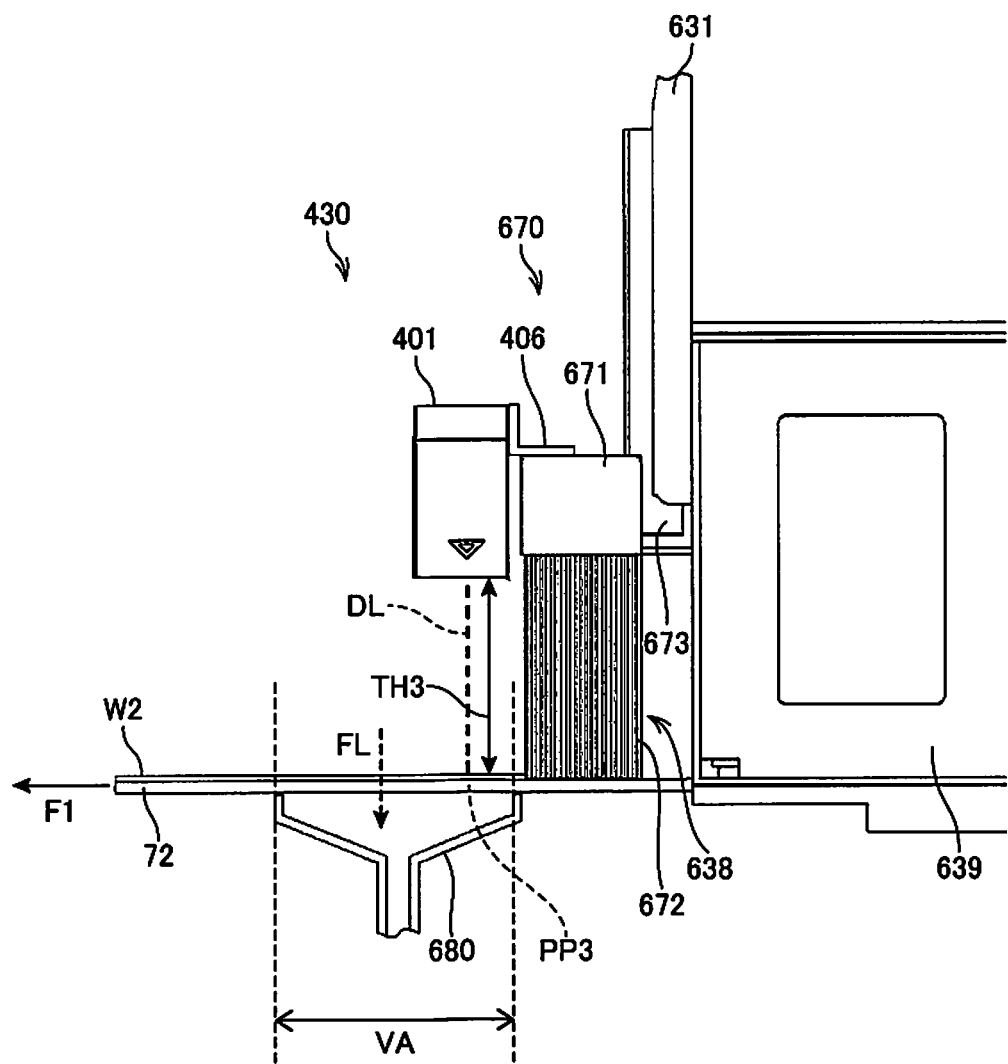
FIG. 11 is a side section view of main parts in the measuring unit in the fifth embodiment of the invention.

FIG. 10 schematically illustrates the configuration of a distributor 60D according to a fifth embodiment of the invention. FIG. 11 is a side section view of main parts of the measurement device 430 in the fifth embodiment of the invention.

This distributor 60D is used in the sheet manufacturing apparatus 100 instead of the distributor 60 described above. The distributor 60D has a housing 63 configured as described in the distributor 60 above, and causes the mixture MX to precipitate from the distribution drum 61 inside the housing 63 and accumulate on the mesh belt 72, forming a second web W2.

This distributor 60D uses a brush unit 670 instead of the roller unit 650 described in the first embodiment. A measurement device 430 is also used instead of the measurement device 400 described above. The distributor 60D also has a suction device 680. Because configurations other than the brush unit 670, suction device 680, and measurement device 430 are the same as in the distributor 60 described above, the same reference numerals are used and further description thereof is omitted. The suction device 680 is an example of a compression device and a first compression device.

Similarly to the roller unit 650, the brush unit 670 is disposed to the opening 638, and closes the opening around the mesh belt 72 and second web W2 that pass through the opening 638.

The brush unit 670 includes a base 671, a brush 672, and an attachment fixture 673. The base 671 matches the size of the opening 638, and is a frame-shaped member that extends along the width direction WD. The brush 672 is configured by a bundle of synthetic resin bristles, and overall is sized to close the opening 638. The brush 672 is attached to the base 671, and is disposed outside the housing 63.

As shown in FIG. 11, the attachment fixture 673 is a bracket affixed to the subframe 663, and the base 671 is affixed to the subframe 663 through the attachment fixture 673.

The measurement device 430 has a single optical detector 401, and attaches the optical detector 401 by means of an attachment fixture 406 connected to the base 671. As shown in FIG. 11, the attachment fixture 406 protrudes from the subframe 663 to the downstream side in the conveyance direction F1. The optical detector 401 is affixed at a position downstream in the conveyance direction F1 from the base 671.

The measurement beam DL the optical detector 401 emits is emitted directly to the surface of the second web W2. As a result, the optical detector 401 measures the distance TH2 from the optical detector 401 to the second web W2. This configuration is the same as in the third embodiment and the fourth embodiment.

The suction device 680 is disposed below the mesh belt 72 on the opposite side as the surface on which the second web W2 accumulates, and suctions air. The suction device 680 is shaped like a horn opening toward the mesh belt 72, and by suctioning air from the open wide end, produces an air current FL passing through the mesh belt 72. The suction device 680 connects through a conduit 682 to a suction blower not shown. For example, the conduit 682 of the suction device 680 may connect to the second collection blower 68 through the second dust collector 67.

The area affected by the air current FL produced by the suction device 680 is the vacuum area VA shown in FIG. 10 and FIG. 11. The second web W2 is compressed by the air current FL in the vacuum area VA.

The optical detector 401 of the measurement device 430 emits the measurement beam DL directly to the surface of the second web W2, and measures the distance TH3 from the optical detector 401 to the second web W2.

The position to which the optical detector 401 emits the measurement beam DL, that is, the position PP3 where thickness is measured, is a position opposite the suction device 680. As a result, the optical detector 401 measures the distance TH3 at a location where the second web W2 is compressed by the air current FL.

The air current FL pushes the second web W2 toward the mesh belt 72 due to the resistance to air flow through the second web W2, and the second web W2 is compressed by this pressure. Because the optical detector 401 measures the second web W2 when the second web W2 is compressed, the thickness of the compressed second web W2 can be acquired from the measurement output by the optical detector 401.

This distributor 60D has the same operational effect as the distributors 60 and 60B of the first embodiment and third embodiment.

The distributor 60D also has a suction device 680 as a compression device. The suction device 680 pulls an air current through the second web W2, and the optical detector 401 measures the thickness of the second web W2 after the second web W2 is compressed by suction from the suction device 680. Because this configuration compresses the second web W2 without using rollers or other means that contact the surface of the second web W2, the compressed second web W2 largely retains the same state in which the mixture MX is deposited in the internal space 62. As a result, how the mixture MX is being deposited in the internal space 62 can be known based on the measurements from the optical detector 401. In addition, because the second web W2 is compressed to desirable density by suction from the suction device 680, highly accurate measurements can be taken.

In addition, in a sheet manufacturing apparatus 100 employing the fibrous feedstock recycling device, web processing device, and fiber feedstock recycling method according to the invention, the measurement device 401 may measure the thickness of the second web W2 referenced to the mesh belt 72 by a configuration using distributor 60D. In this configuration, the controller 110 can calculate the thickness of the second web W2 by subtracting a reference value from the measurement of the distance TH2 by the optical detector 401. In this case, because both variation in the thickness of the second web W2 and the thickness of the second web W2 can be directly acquired, whether or not the thickness of the second web W2 formed by the distributor 60 and the second web former 70 is appropriate can be quickly determined.

6. Embodiment 6

Figure 12:
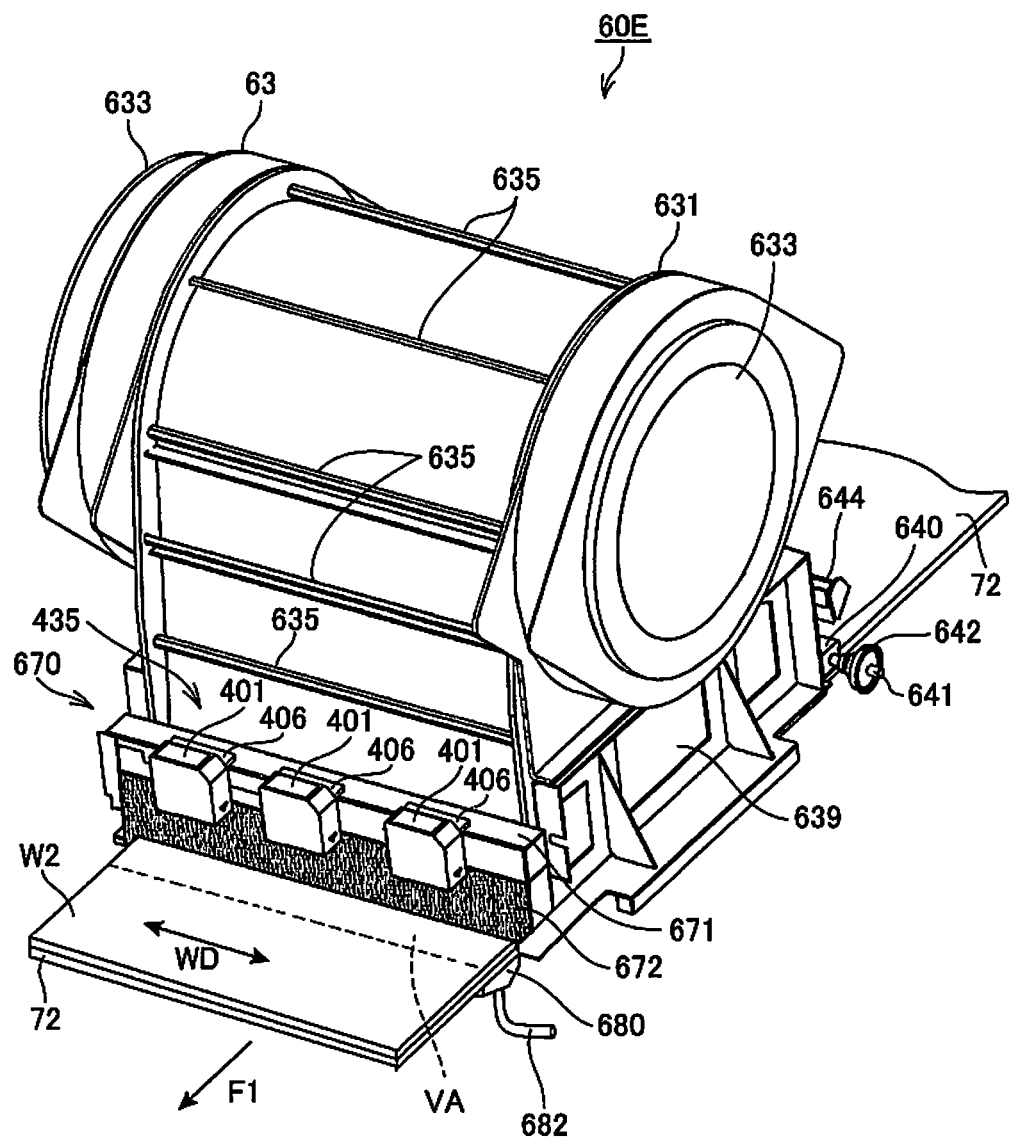
FIG. 12 is an oblique view of the distributor in a sixth embodiment of the invention.

FIG. 12 schematically illustrates the configuration of a distributor 60E according to the sixth embodiment of the invention.

This distributor 60E is a configuration using a measurement device 435 instead of the measurement device 430 used in the distributor 60D described above, and is disposed to the sheet manufacturing apparatus 100 in the same way as the distributor 60D.

While the measurement device 430 in FIG. 10 is configured with one optical detector 401, this measurement device 435 is configured with multiple optical detectors 401 disposed along the width direction WD. This embodiment illustrates an example having three optical detectors 401, but may be configured with more optical detectors 401, or there may be only two.

Each of the optical detectors 401 is connected and affixed to the subframe 663 through an attachment fixture 406. As in the configuration of the measurement device 430 shown in FIG. 11, each of the optical detectors 401 is on the downstream side of the base 671 in the conveyance direction F1. Each of the optical detectors 401 emits a measurement beam DL to the surface of the second web W2, and measures the distance to the second web W2.

The measurement device 435 measures the distance to the second web W2 by each of the three optical detectors 401, and outputs the measurement to the controller 110. More specifically, the measurement device 435 measures the thickness of the second web W2 at different positions along the width direction WD. As a result, the controller 110 can detect the distribution of the thickness of the second web W2 in the width direction WD based on the measurements from the measurement device 435.

This distributor 60E has the same operational effect as the distributor 60 in the first embodiment and the distributor 60D of the fifth embodiment.

In addition, in a sheet manufacturing apparatus 100 employing the fibrous feedstock recycling device, web processing device, and fiber feedstock recycling method of the sixth embodiment of the invention, the measurement device 435 includes multiple optical detectors 401. The multiple optical detectors 401 are disposed in a direction intersecting the conveyance direction of the second web W2, and each measures the thickness of the second web W2. As a result, the thickness of the second web W2 can be measured at different positions along the width direction WD, and information related to the distribution of the thickness along the width direction WD can be acquired.

7. Other Embodiments

The embodiments described above are only examples of specific embodiments of the invention as described in the accompanying claims, do not limit the invention, and can be varied in many ways as described below without departing from the scope and spirit of the invention as described in the accompanying claims.

For example, the foregoing embodiments describe, as configurations for compressing the second web W2, a configuration that compresses by means of a second seal roller 65, and a configuration that compresses by suction from a suction device 680. However, the invention is not so limited and various other configurations may be used, such as configurations that compress by pushing a flat plate against the second web W2. The materials and other details about the distributors 60, 60A, 60B, 60C, 60D, and 60E described in the foregoing embodiments may also be appropriately modified as desired.

The foregoing embodiments describe, as a fibrous feedstock recycling device according to the invention, a dry process sheet manufacturing apparatus 100 that acquires material by defibrating feedstock in air, and uses the defibrated material to manufacture sheets S. However, the invention is not so limited, and may also be applied to electrostatic sheet manufacturing apparatuses that attract material containing fiber defibrated in air to the surface of a drum by static attraction, and manufacture the material attracted to the drum into sheets.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No: 2018-128783, filed Jul. 6, 2018 is expressly incorporated by reference herein.

What is claimed is:

1. A measuring device comprising:
a distributor configured to disperse material containing fiber;
an accumulator configured to accumulate the material dispersed by the distributor;
a compression device configured to compress accumulated material accumulated on the accumulator; and
a measurement device configured to measure a thickness of the accumulated material compressed by the compression device.

2. The measuring device described in claim 1, wherein:
the measurement device measures a thickness of the accumulated material after the accumulated material is compressed by the compression device.

3. The measuring device described in claim 2, wherein:
the compression device includes a pressure roller that contacts the accumulated material and applies pressure to the accumulated material, and a displacement member enabling the pressure roller to move according to the thickness of the accumulated material; and
the measurement device measures displacement of the pressure roller.

4. The measuring device described in claim 3, wherein:
the distributor has a case, and a configuration that disperses the material inside the case; and
the pressure roller is disposed to a discharge exit through which the accumulated material is conveyed out from the case.

5. The measuring device described in claim 2, wherein:
the compression device has a suction device configured to suction air through the accumulated material; and
the measurement device measures a thickness of the accumulated material suctioned and compressed by the suction device.

6. The measuring device described in claim 1, further comprising:
a conveyor having a conveyance surface on which the accumulated material accumulates, and configured to convey the accumulated material;
the measurement device measuring a thickness of the accumulated material referenced to the conveyance surface at a position on a same side of the conveyance surface as the accumulated material.

7. The measuring device described in claim 1, further comprising:
a plurality of measurement devices disposed along a direction intersecting a conveyance direction of the accumulated material, each of the plural measurement devices measuring a thickness of the accumulated material.

8. A web processing device comprising:
a distributor configured to disperse material containing fiber;
an accumulator configured to accumulate the material dispersed by the distributor and form a web;
a first compression device configured to compress the web; and
a measurement device configured to measure a thickness of the web compressed by the first compression device; and
a second compression device configured to compress the web compressed by the first compression device after measurement by the measurement device.

9. The web processing device described in claim 8, wherein:
the first compression device compresses the web by less pressure than the second compression device.

10. A fibrous feedstock recycling device comprising:
a defibrator configured to defibrate material containing fiber;
a distributor configured to disperse defibrated material defibrated by the defibrator;
an accumulator configured to accumulate the defibrated material dispersed by the distributor and form a web;
a first compression device configured to compress the web; and
a measurement device configured to measure a thickness of the web compressed by the first compression device; and
a second compression device configured to compress the web compressed by the first compression device after compression by the first compression device.

* * * * *